ates Patent [19]
Wiley

[11] 3,835,367
[45] Sept. 10, 1974

[54] OVERLOAD PROTECTION CIRCUITS
[75] Inventor: David Wiley, Walsall, England
[73] Assignee: Joseph Lucas (Electrical) Limited, Birmingham, England
[22] Filed: Feb. 13, 1973
[21] Appl. No.: 332,097

[30] Foreign Application Priority Data
Feb. 19, 1972  Great Britain...................... 7785/72

[52] U.S. Cl....................... 322/28, 317/16, 317/31, 317/33 SC, 317/50, 320/40, 320/64
[51] Int. Cl. ........................................... H02p 9/30
[58] Field of Search ............. 320/60, 61, 64, 39, 40; 317/16, 31, 33 SC, 49, 50; 322/28

[56] References Cited
UNITED STATES PATENTS
3,436,639    4/1969   Burkett et al..................... 320/64 X
3,488,560    1/1970   Konopa............................ 322/28 X
3,740,637    6/1973   Iwaki et al. ..................... 322/28 X Primary Examiner—James D. Trammell
Attorney, Agent, or Firm—Holman & Stern

[57] ABSTRACT

An overload protection circuit has a thyristor the anode and cathode of which are connected across a pair of supply lines requiring protection. Connected across the anode-cathode is a series circuit including a voltage dependent resistance and a resistor, the junction of which is connected to the gate of the thyristor. At the nominal voltage of the system, the voltage dependent resistance has a high value, but it has a substantially reduced value at voltages substantially above the nominal voltage of the system. The voltage dependent resistance protects the system against low current volts, and the thyristor is turned on for high current volts.

5 Claims, 2 Drawing Figures

3,835,367

OVERLOAD PROTECTION CIRCUITS

This invention relates to overload protection circuits, particularly for use in battery charging systems on road vehicles.

An overload protection circuit in accordance with the invention comprises a thyristor the anode and cathode of which are intended to be connected across a pair of supply lines requiring protection, and a series circuit connected across the anode-cathode of the thyristor and including a voltage dependent resistance and a resistor, the junction of which is connected to the gate of the thyristor, the voltage dependent resistance having a high value at the nominal voltage of the system, and a substantially reduced value at voltages substantially above the nominal voltage of the system, the arrangement being such that in use when a fault occurs such that current flows through the voltage dependent resistor, for low current faults the thyristor will not conduct and the system is protected by the voltage dependent resistor and resistor in series, but for high current faults the thyristor is turned on to protect the system.

In one arrangement, said resistor is bridged by a Zener diode and a resistor in series, and the junction of the Zener diode and resistor is connected to the gate of the thyristor. The voltage dependent resistor is preferably a Zener diode, and the resistor in series with the voltage dependent resistor is preferably chosen to have a very low inductance. Ideally, a printed circuit resistor is employed.

In another aspect, the invention resides in a battery charging system for a road vehicle, comprising in combination a generator having a field winding, a battery which in use is charged by the generator, a semiconductor voltage regulator for regulating the output of the generator by varying the current flow through the field winding, and a protection circuit for preventing destruction of the regulator by transients in the system, said protection circuit comprising in combination a thyristor having its anode-cathode path connected across the regulator, and a series circuit connected across the regulator and including a voltage-dependent resistance and a resistor, the voltage-dependent resistance having a high value at the nominal system voltage but a substantially reduced value when the voltage across the regulator rises above a predetermined value, the junction of the voltage dependent resistance and the resistor being connected to the gate of the thyristor, and the arrangement being such that if a low current transient occurs across the regulator, the regulator is protected by current flowing through the voltage dependent resistor and the resistor in series, but if a high current transient occurs, then the thyristor conducts to protect the regulator.

In the arrangement specified in the preceding paragraph, the voltage-dependent resistor is preferably a Zener diode. Moreover, the resistor is preferably a printed circuit resistor, or some other resistor having an extremely low inductance. Moreover, the resistor may be bridged by a Zener diode and a further resistor in series, with the junction of the Zener diode and further resistor connected to the gate of the thyristor.

In the accompanying drawings.

Figure 1:
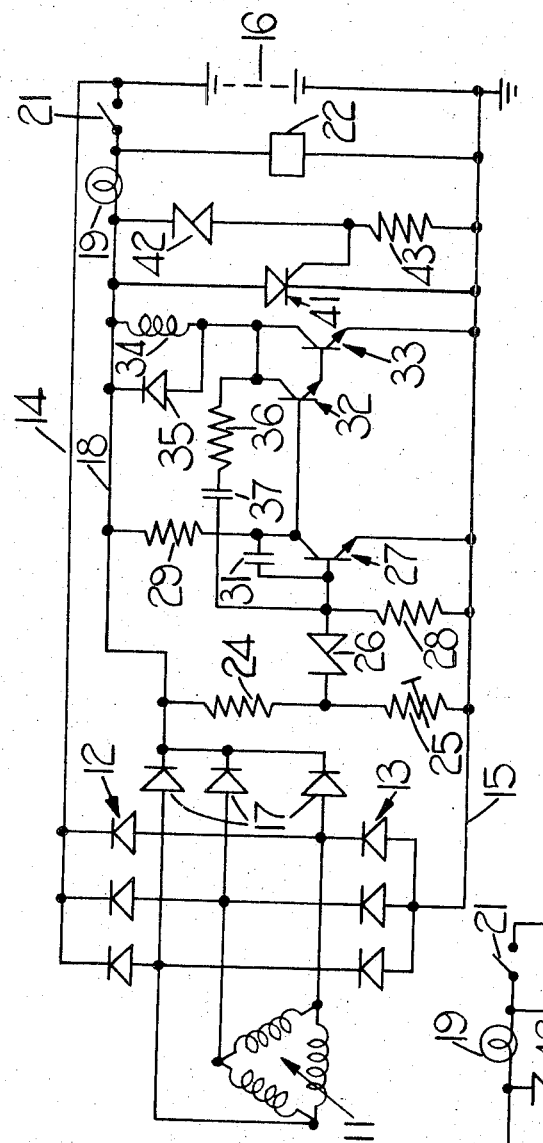
FIG. 1 is a circuit diagram illustrating one example of the invention.

Referring to FIG. 1, there is provided a three phase alternator 11, which supplies power through a full wave rectifier consisting of two sets of diodes 12 and 13 to positive and negative supply lines 14, 15 between which the battery 16 of a road vehicle is connected. The line 15 is earthed. There are further provided three auxiliary diodes 17 connected to the phase points of the alternator and providing power to a further positive supply line 18 which is connected to the line 14 through a warning lamp 19 and the vehicle ignition switch 21 in series. The ignition controlled loads of the vehicle are indicated at 22 and are connected between the junction of the lamp 19 and ignition switch 21 and the line 15. Loads 22 will of course include the contact breaker of the vehicle, which controls current flow in the primary winding of the vehicle ignition coil, the secondary winding of which is connected to the plugs of the vehicle in turn through a distributor.

Connected in series between the lines 18, 15 are a resistor 24 and a pre-set resistor 25. The junction of the resistors 24 and 25 is connected through a Zener diode 26 to the base of an n-p-n transistor 27, the base along being connected through a resistor 28 to the line 15. The emitter of the transistor 27 is connected to the line 15 and its collector is connected through a resistor 29 to the line 18, whilst its base and collector are bridged by a capacitor 31. The collector of the transistor 27 is connected to the base of an n-p-n transistor 32 having its emitter connected to the base of an n-p-n transistor 33, the emitter of which is connected to the line 15 and the collector of which is connected to the line 18 through the field winding 34 of the alternator 11, the winding 34 being bridged by a diode 35. The collectors of the transistors 32 and 33 are connected to the base of the transistor 27 through a resistor 36 and a capacitor 37 in series.

The lines 18, 15 are further bridged by two parallel paths, one of which contains the anode-cathode path of a thyristor 41, and the other of which contains a Zener diode 42 in series with a resistor 43, the junction of the Zener diode 42 and resistor 43 being connected to the gate of the thyristor 41.

In operation, provided that no fault occurs in the system the components 41, 42 and 43 do not conduct, and so for the moment they can be ignored. When the ignition switch 21 is open and the alternator is not producing an output, then no current flows in any part of the circuit. On closing the ignition switch 21, the battery 16 provides power to the loads 22, and current also flows through the switch 21 and the warning lamp 19, and thence by way of the resistor 29 and the base-emitter paths of the transistors 32 and 33 to energise the field winding 34, the lamp 19 being illuminated at this stage. When the engine has started and the alternator 11 is producing an output, then the potential of the line 14 is substantially equal to the potential of the line 18, and so the regulator is supplied with power by the lines 18, 15, and the warning lamp 19 is extinguished.

Provided the voltage between the lines 18 and 15 is below a predetermined value, the transistor 27 is not conductive and the transistor 33 conducts to provide the required field current. However, when a predetermined voltage is reached, the Zener diode 26 breaks down to provide current to the transistor 27, which turns on to remove base current from the transistor 32 and thereby remove base current from the transistor 33. The circuit oscillates between one state with the transistor 27 on and the transistors 32 and 33 off, and another state in which the transistor 27 is off and the transistor 32 and 33 are fully on, the oscillations being caused by the positive feedback circuits through the resistor 36 and capacitor 37, and the mark-space ratio of the oscillations being controlled by the current flowing through the Zener diode 26, which is dependent on the voltage between the lines 18 and 15. It will of course be appreciated that during periods when the transistor 33 is off, energy stored in the winding 34 causes current to flow through the diode 35.

In systems of this kind, it is extremely important to protect the voltage regulator, because transients on the line 18 can completely destroy the regulator in certain circumstances. There are basically two types of transients which require to be considered, namely low current transients and high current transients. A good example of a low current transient is seen by considering the situation when the battery 16 becomes disconnected, so that the smoothing effect of the battery 16 is lost, and transients produced by the ignition system 22 are applied to the lines 18 and 15 by way of the cold filament of the lamp 19. In a 12 volt system, typical transients that would be produced in such circumstances might be at an open circuit source voltage of 400 volts, but with a relatively low current limit of 3 amps for relatively small periods of the order of 30 microseconds. In such circumstances the Zener diode 42 conducts and the transient current flows through the Zener diode 42 and the resistor 43 in series, so that the regulator is protected, but the voltage appearing across the resistor 43 is insufficient to turn on the thyristor 41. Thus, for low current transients, protection is afforded by the components 42 and 43.

An example of a high current, high power transient which could also damage the regulator is best seen by considering what happens if the line 14 becomes disconnected. At the instant of disconnection, the potential between the lines 18 and 15 will rise towards the instantaneous open circuit voltage of the alternator. As a result, the transistor 33 will cease to conduct, and the prevailing field current will then decay expotentially by way of the diode 35. Thus, when the line 14 is disconnected, the voltage between the lines 18, 15 rises to a peak value and then decays expotentially. The peak value depends on the open circuit voltage characteristic of the alternator and its speed and output at the moment of disconnection. Typically in a 12 volt system the signal occuring between the lines 18 and 15 could have a peak value of 120 volts decaying expotentially over a period of 0.25 seconds, since a typical source impedance is about 1.4 ohms, it will be seen that if the transistor 33 breaks down, a large current can flow. It will be appreciated that this would be an extremely serious matter and would ruin the regulator if no protection were to be afforded. When such a high current, high power transient occurs, then the Zener diode 42 conducts as previously, and current flows through the Zener diode 42 and resistor 43. However, the voltage across the resistor 43 is now sufficient to turn on the thyristor 41, so that the thyristor 41 conducts to protect the regulator.

It will of course be appreciated that the Zener diode 42 could be replaced by other forms of voltage-dependent resistor, although the Zener diode is the preferred component. Any other form of voltage dependent resistor employed would have to have a substantial resistance at the nominal supply of the system, so that the normal conduction through the paths 42, 43 was small, but a substantially reduced resistance at elevated voltages so that the protection circuit operates in the manner described.

It is preferred that the resistor 43 should have an extremely low inductance, so as to minimise any possibility of unwanted triggering of the thyristor 41. Ideally this can be achieved by having a printed circuit resistor 43.

It is known to use a Zener diode and a thyristor in combination to turn on the thyristor when the voltage between a pair of lines exceeds a predetermined value and thereby afford protection. However, in the known system there is no two-level protection of the form described above. The extremely simple arrangement for affording the protection as described provides complete protection of the regulator, and will also allow the vehicle to be moved with the battery 16 disconnected, which is a great advantage.

Figure 2:
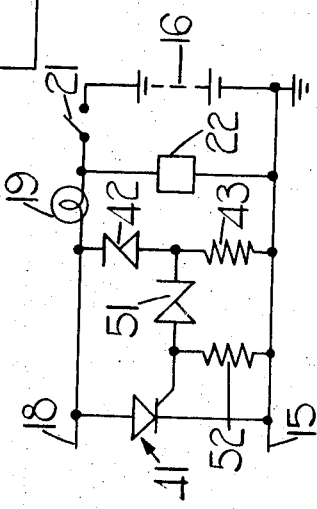
FIG. 2 illustrates a modification.

Referring now to the modification shown in FIG. 2, similar components have been designated with the same reference numerals. It will be seen that the only difference is that the junction of the Zener diode 42 and resistor 43 is now connected to the line 15 by way of a Zener diode 51 and a resistor 52 in series, and the junction of the Zener diode 51 and resistor 52 is connected to the gate of the thyristor 41. The arrangement is substantially unaffected. Low current transients are conducted through the Zener diode 42 and resistor 43, and high current transients produce a voltage across the resistor 43 which breaks down the Zener diode 51 to turn on the thyristor 41 as in FIG. 1. This arrangement permits the current level in the resistor 43 at which the thyristor is fixed to be set more accurately than in FIG. 1.

In one particular arrangement, the Zener diodes 42 and 51 used in FIG. 2 were 20 volt and 8.2 volt Zener diodes respectively.

I claim:

1. A battery charging system for a road vehicle, comprising in combination a generator having a field winding, a battery which in use is charged by the generator, a semi-conductor voltage regulator for regulating the output of the generator by varying the current flow through the field winding, and a protection circuit for preventing destruction of the regulator by transients in the system, said protection circuit comprising in combination a thyristor having its anode-cathode path connected across the regulator, and a series circuit connected across the regulator and including a voltage-dependent resistance and a resistor, the voltage-dependent resistance having a high value at the nominal system voltage but a substantially reduced value when the voltage across the regulator rises above a predetermined value, the junction of the voltage dependent resistance and the resistor being connected to the gate of the thyristor, and wherein the voltage developed across said resistor in series with said voltage-dependent resistance, when the voltage across the regulator rises above said predetermined value, is insufficient to turn on said thyristor during the occurrence of a low current transient across the regulator, the voltage developed during a high current transient effecting conduction of said thyristor to protect the regulator.

2. A system as claimed in claim 1 in which the resistor is bridged by a Zener diode and a further resistor in series, the junction of the Zener diode and further resistor being connected to the gate of the thyristor.

3. A system as claimed in claim 1 in which the voltage-dependent resistor is a Zener diode, the voltage developed across said resistor in series with the Zener diode at the instant when the Zener diode conducts being insufficient to turn on said thyristor.

4. A system as claimed in claim 3 in which the resistor in series with the voltage-dependent resistor has a very low inductance.

5. A system as claimed in claim 4 in which the resistor in series with the voltage-dependent resistor is a printed circuit resistor.

* * * * *